United States Patent
Fan

(10) Patent No.: US 7,986,875 B2
(45) Date of Patent: Jul. 26, 2011

(54) SOUND-BASED FOCUS SYSTEM AND FOCUS METHOD THEREOF

(75) Inventor: Shih-Yuan Fan, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/482,392

(22) Filed: Jun. 10, 2009

(65) Prior Publication Data

US 2010/0166406 A1    Jul. 1, 2010

(30) Foreign Application Priority Data

Dec. 29, 2008  (CN) .......................... 2008 1 0306623

(51) Int. Cl.
*G03B 17/00*  (2006.01)
*G03B 3/12*  (2006.01)

(52) U.S. Cl. .......................... 396/105; 396/79

(58) Field of Classification Search ............ 396/77, 396/79, 80, 105
See application file for complete search history.

(56) References Cited

U.S. PATENT DOCUMENTS

| | | | | |
|---|---|---|---|---|
| 4,167,316 A * | 9/1979 | Johnson et al. | ................. | 396/74 |
| 4,168,895 A * | 9/1979 | Pizzuti | ........................... | 396/105 |
| 4,178,087 A * | 12/1979 | Shenk et al. | ................... | 396/133 |
| 4,199,244 A * | 4/1980 | Shenk | ........................... | 396/105 |
| 4,199,246 A * | 4/1980 | Muggli | ......................... | 396/101 |
| 4,284,336 A * | 8/1981 | Iwata et al. | .................... | 396/105 |
| 4,299,467 A * | 11/1981 | Wagner et al. | ................ | 396/105 |
| 4,309,098 A * | 1/1982 | Shenk | ........................... | 396/105 |
| 4,331,409 A * | 5/1982 | Cianci et al. | .................. | 396/105 |
| 4,362,372 A * | 12/1982 | Kiesel | ............................ | 396/89 |
| RE31,219 E * | 4/1983 | Shenk | ........................... | 396/105 |
| 4,381,144 A * | 4/1983 | Breslau | ......................... | 396/27 |
| 4,443,087 A * | 4/1984 | Kashihara et al. | ............. | 396/105 |
| 4,487,494 A * | 12/1984 | Ishikawa | ....................... | 396/105 |
| 4,490,814 A * | 12/1984 | Shenk | ........................... | 367/140 |
| 4,512,646 A * | 4/1985 | Kitaura et al. | ................ | 396/105 |
| 4,531,822 A * | 7/1985 | Shenk | ........................... | 396/79 |
| 4,547,055 A * | 10/1985 | Ehrenfried | .................... | 396/122 |
| 5,109,248 A * | 4/1992 | Petrakos et al. | .............. | 396/155 |
| 5,703,834 A * | 12/1997 | Bonnefoy | ........................ | 367/99 |
| 5,739,857 A * | 4/1998 | Kaneda | ......................... | 348/349 |
| 5,995,763 A * | 11/1999 | Posa et al. | ....................... | 396/57 |
| 2007/0071429 A1 * | 3/2007 | Woehler | .......................... | 396/89 |
| 2010/0033585 A1 | 2/2010 | Ye | | |

FOREIGN PATENT DOCUMENTS

CN       101068308 A     11/2007

* cited by examiner

*Primary Examiner* — Rodney E Fuller
(74) *Attorney, Agent, or Firm* — Zhigang Ma

(57) ABSTRACT

A sound-based focus system includes an imaging device and focus controller. The imaging device is configured for capturing an image. The focus controller includes a sound detecting module and a control module. The sound detecting module is configured for obtaining the position coordinates of a sound source. The control module is configured for controlling the imaging device to focus on the sound source according to the position coordinates thereof.

15 Claims, 3 Drawing Sheets

SOUND-BASED FOCUS SYSTEM AND FOCUS METHOD THEREOF

BACKGROUND

1. Technical Field

The present disclosure relates to focus technologies and, particularly, to a sound-based focus system and a focus method thereof.

2. Description of the Related Art

Commonly, electronic devices such as digital cameras include a focus system to automatically focus on a visible object such as a face for capturing an image. However, when a photographer is interested in shooting a picture of a short-living scene, such as a roaring lion, it usually takes too long for him or her to focus the camera on and capture an image of the lion in the act of roaring, thereby it is not convenient for users with conventional focus system to take advantage of unanticipated photo opportunities.

Therefore, it is desirable to provide a sound-based focus system and a focus method thereof which can overcome or at least alleviate the above-mentioned problem.

DETAILED DESCRIPTION

Embodiments of the disclosure will now be described in detail with reference to the accompanying drawings.

Figure 1:
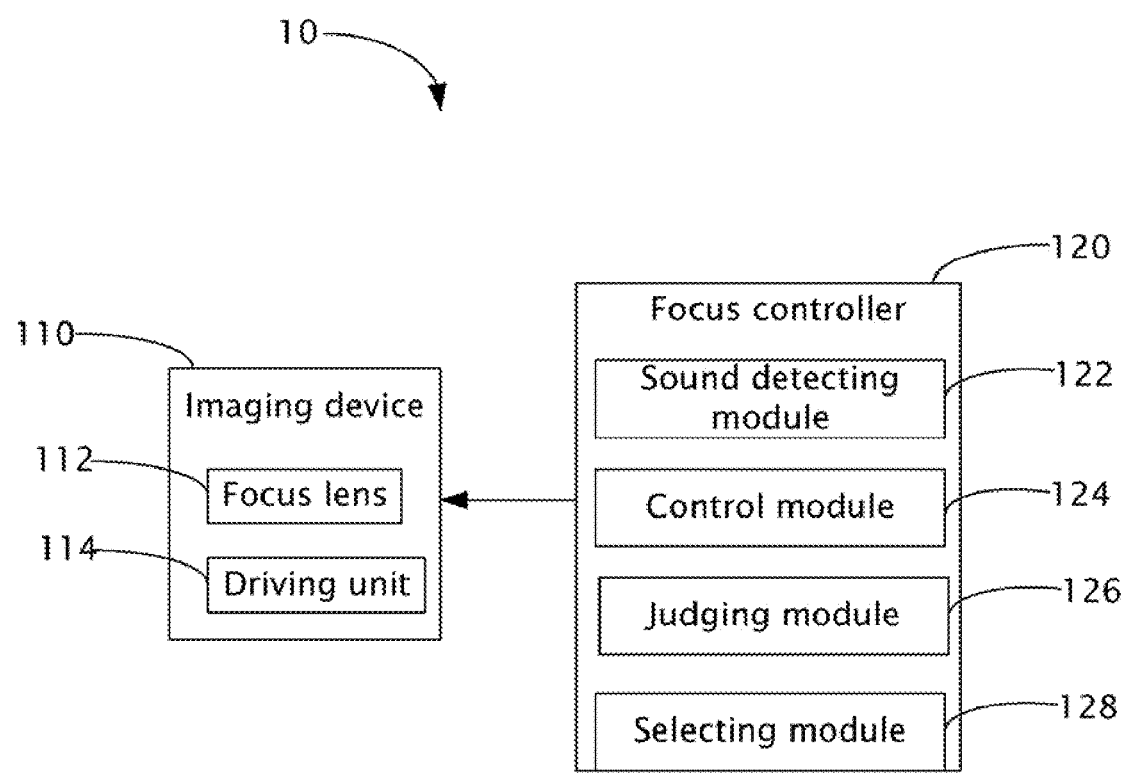
FIG. 1 is a block diagram of a sound-based focus system according to an exemplary embodiment.

Referring to FIG. 1, a sound-based focus system 10 according to an exemplary embodiment includes an imaging device 110 and a focus controller 120.

The imaging device 110 is configured for capturing an image. It includes a focus lens 112 and a driving unit 114.

The focus lens 112 may include many lenses which may be grouped into several lens groups. The focus lens 112 can be a zoom or fixed-focal type.

The driving unit 114 is configured for driving the focus lens 112 to move along an optical axis of the focus lens 112 and adjusting an orientation of the focus lens 112 by means of rotation to aim at an object, such as a sound source.

The focus controller 120 is configured for controlling the driving unit 114 to drive the focus lens 112, according to the position coordinates of a sound source S1, to focus on the sound source S1. The focus controller 120 includes a sound detecting module 122 and a control module 124.

Figure 2:
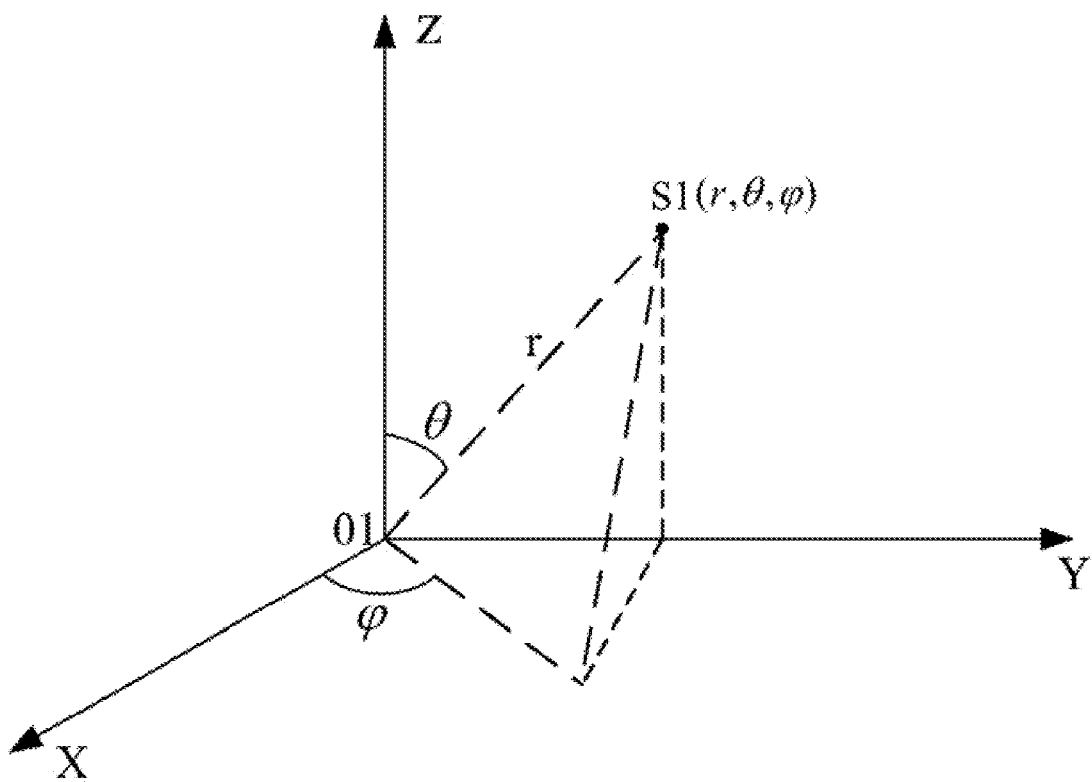
FIG. 2 is a schematic diagram of a spherical coordinate system of the sound-based focus system of FIG. 1 for focusing on one sound source.

The sound detecting module 122 is configured for obtaining the position coordinates and intensity of sound sources. If the number of the sound sources is one, such as the sound source S1, the sound detecting module 122 obtains the position coordinates of the sound source S1. Referring to FIG. 2, a spherical coordinate system XYZ is established, wherein the imaging device 110 is taken as the origin 01, the optical axis of the focus lens 112 is the X axis. In this embodiment, the sound source S1 is positioned on the Y-Z plane. The radial distance between the origin 01 and the sound source S1 is r. The zenith angle from the positive Z-axis to the sound source S1 is θ. The azimuth angle from the positive X-axis to the orthogonal projection of the sound source S1 in the X-Y plane is φ. The position coordinates of the sound source S1 includes the radial distance r, the zenith angle θ, and the azimuth angle φ. The radial distance r, the zenith angle θ, and the azimuth angle φ can be achieved by applying ASP (Array Signal Process) technology to calculate the differences of time spent from the sound sources to the imaging device 110. The intensity of the different sound sources can be achieved by measuring the amplitude of sound emitted out by the sound sources. The foregoing methods for measuring the position coordinates and the sound intensity of the sound sources is familiar to a skilled in the art, thus, a detailed description is omitted.

The control module 124 is configured for controlling the driving unit 114 to drive the focus lens 112 to focus on the detected sound source S1, according to the position coordinates of the sound source S1.

If the number of the sound sources is more than one, the sound-based focus system 10 further includes a judging module 126 and a selecting module 128. The judging module 126 is configured for judging the number of the sound sources. The judging module 126 can judge the number of the sound sources according to the intensity, the radial distance, the zenith angle, and azimuth angle of each sound source. The selecting module 128 selects a sound source from the sound sources based on a predefined selecting condition when the number is more than one. The predefined selecting condition is determined according to need of users. The selecting module 128 selects a sound source by judging the intensity, the radial distance, the zenith angle, and azimuth angle of each sound source, such as a sound source having the higher intensity or the shortest radial distance of the sound sources is selected.

The selecting module 128 can select a sound source based on the intensities of the sound sources, such as that the selecting module 128 selects a sound source having higher or lower intensity from two sound sources. For another example, if two sound sources have the same intensity and different radial distances, the selecting module 128 can select the sound source having the longer or the shorter radial distance.

As yet another example, if two sound sources have the same radial distance but different intensities, the selecting module 128 can select the sound source having higher or lower intensity.

Figure 3:
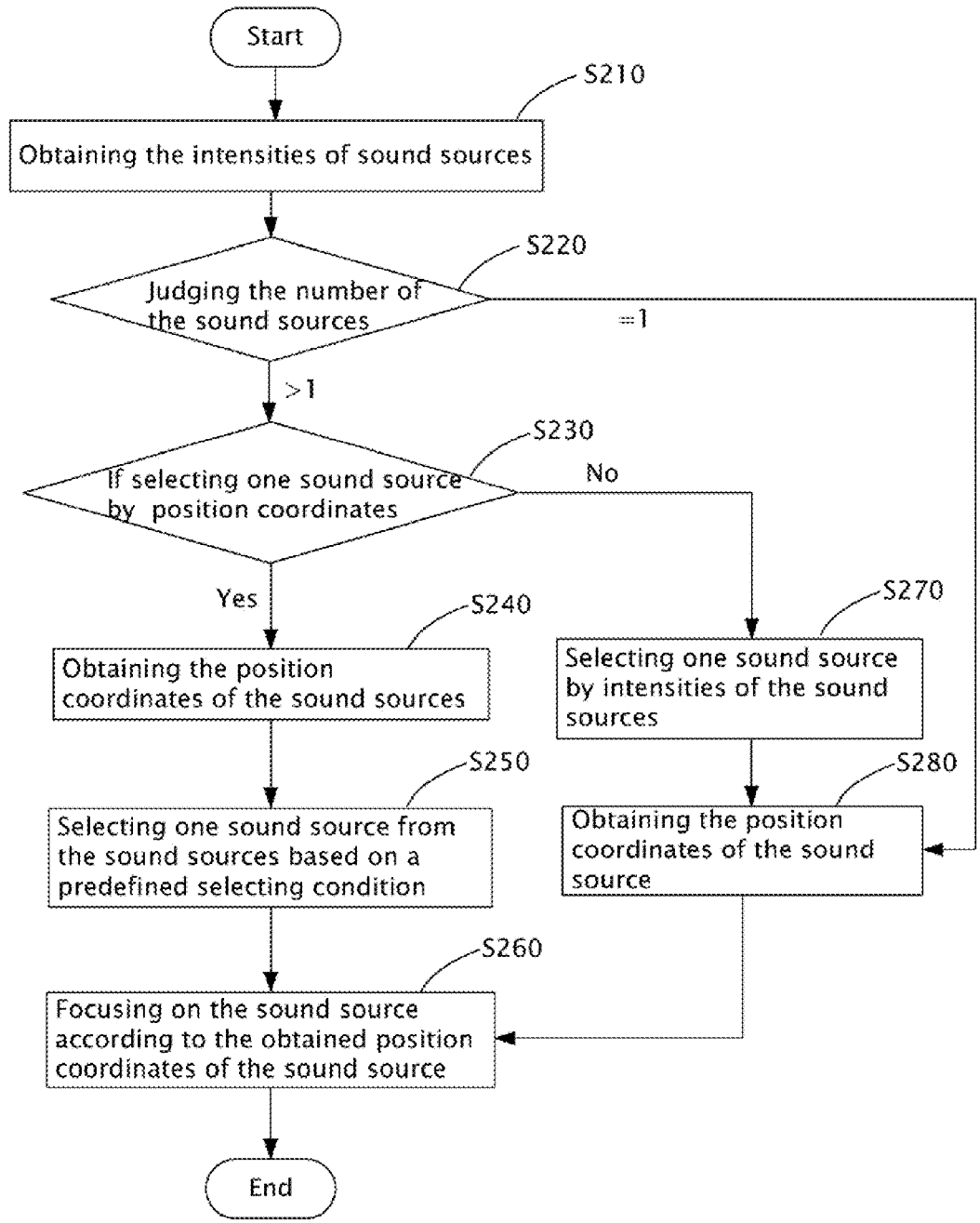
FIG. 3 is a flowchart of a sound-based focus method according to an exemplary embodiment.

Referring to FIG. 3, a sound-based focus method can be exemplarily implemented by the sound-based focus system 10, according to the exemplary embodiment, and includes the following steps S210-S280.

In step 210, the sound detecting module 122 obtains the intensities of sound sources.

In step 220, the judging module 126 judges the number of the sound sources. If the number of the sound sources is one, go to step 280. If the number of the sound sources is more than one, go to step 230.

In step 230, if the selecting module 128 selects one sound source from the sound sources by the position coordinates of the sound sources, go to step 240. If the selecting module 128 selects one sound source from the sound sources by the intensities of the sound sources, go to step 270.

In step 240, the sound detecting module 122 obtains the position coordinates of the sound sources. After obtaining the coordinates, go to step 250.

In step 250, the selecting module 128 selects one sound source from the sound sources based a predefined selecting condition, such as that the selecting module 128 selects the sound source having the longer or the shorter radial distance. After selection, go to step 260.

In step 260, the control module 124 controls the driving unit 114 to drive the focus lens 112 to focus on the sound source, according to the position coordinates of the sound source.

In step 270, the selecting module 128 selects one sound source from the sound sources by the intensities of the sound sources, such as that the selecting module 128 selects one sound source having higher or lower intensity. After selection, go to step 280.

In step 280, the sound detecting module 122 obtains the position coordinates of the sound source. In this embodiment, the position coordinates include the radial distance r, the zenith angle θ and the azimuth angle φ of the sound source. After obtaining the coordinates, go to step 260.

The sound-based focus system and method can focus on a sound source for capturing an image in time, thereby it is convenient for users to take advantage of unanticipated photo opportunities.

It is to be understood, however, that even though numerous characteristics and advantages of the embodiments have been set forth in the foregoing description, together with details of the structures and functions of the embodiments, the disclosure is illustrative only, and changes may be made in details, especially in matters of arrangement of parts within the principles of the invention to the full extent indicated by the broad general meaning of the terms in which the appended claims are expressed.

What is claimed is:

1. A sound-based focus system comprising:
    an imaging device configured for capturing an image, comprising a focus lens and a driving unit; and
    a focus controller comprising:
        a sound detecting module configured for obtaining the position coordinates of sound sources;
        a judging module configured for judging the number of sound sources;
        a selecting module configured for selecting a sound source based on a predefined selecting condition when the number of the sound sources is more than one; and
        a control module configured for controlling the driving unit to drive the focus lens to move along an optical axis of the focus lens and to adjust the orientation of the focus lens by means of rotation to aim at the sound source in order to focus on the sound source according to the position coordinates thereof.

2. The sound-based focus system of claim 1, wherein the control module controls the driving unit to drive the focus lens to focus on the detected sound source according to the position coordinates of the sound source.

3. The sound-based focus system of claim 1, wherein the control module controls the driving unit to drive the focus lens to focus on the selected sound source according to the position coordinates when the number oldie sound sources is more than one.

4. The sound-based focus system of claim 1, wherein the sound detecting module is further configured for obtaining the intensities of the sound sources.

5. The sound-based focus system of claim 4, wherein the selecting module selects a sound source having the highest intensity when the number of the sound sources is more than one.

6. The sound-based focus system of claim 4, wherein the selecting module selects a sound source having the lowest intensity when the number of the sound sources is more than one.

7. The sound-based focus system of claim 1, wherein the selecting module selects a sound source having the longest radial distance when the number of the sound sources is more than one.

8. The sound-based focus system of claim 1, wherein the selecting module selects a sound source having the shortest radial distance when the number of the sound sources is more than one.

9. A sound-based focus method comprising:
    obtaining the position coordinates of sound sources;
    judging the number of sound sources;
    selecting a sound source based on a predefined selecting condition when the number of the sound sources is more than one; and
    driving a focus lens of an imaging device to move along an optical axis of the focus lens and to adjust the orientation of the focus lens by means of rotation to aim at the sound source in order to focus on the sound source according to the position coordinates thereof.

10. The sound-based focus method of claim 9, further comprising a step of obtaining the position coordinates of the sound sources.

11. The sound-based focus method of claim 9, wherein the step of selecting comprises selecting a sound source having the longest radial distance when the number of the sound sources is more than one.

12. The sound-based focus method of claim 9, wherein the step of selecting comprises selecting a sound source having the shortest radial distance when the number of the sound sources is more than one.

13. The sound-based locus method of claim 9, further comprising a step of obtaining the intensities of the sound sources after the step of judging the number of sound sources.

14. The sound-based focus method of claim 13, wherein the selecting step comprises selecting a sound source having the highest intensity when the number of the sound sources is more than one.

15. The sound-based focus method of claim 13, wherein the selecting step comprises selecting a sound source having the lowest intensity when the number of the sound sources is more than one.

* * * * *